US006272260B1

(12) United States Patent
Furukawa et al.

(10) Patent No.: US 6,272,260 B1
(45) Date of Patent: Aug. 7, 2001

(54) METHOD OF AND APPARATUS FOR PROCESSING AN IMAGE FILTER

(75) Inventors: Itaru Furukawa; Fujio Akioka, both of Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 0 days.

(21) Appl. No.: 09/040,303

(22) Filed: Mar. 18, 1998

(30) Foreign Application Priority Data

Mar. 26, 1997 (JP) .......................................... 9-73570
Mar. 31, 1997 (JP) .......................................... 9-79880

(51) Int. Cl.$^7$ ...................................... G06K 9/40
(52) U.S. Cl. ........................... 382/261; 382/260
(58) Field of Search .................... 382/260, 261, 382/268, 275, 252; 358/534

(56) References Cited

U.S. PATENT DOCUMENTS 5,003,616 * 3/1991 Orita et al. ............................. 382/41
5,768,440 * 6/1998 Campanelli et al. ................ 382/261

* cited by examiner

Primary Examiner—Thomas D. Lee
Assistant Examiner—Stephen Brinich
(74) Attorney, Agent, or Firm—McDermott, Will & Emery

(57) ABSTRACT

Average density values are calculated from a pixel group which contains an objective pixel and neighboring pixels around the objective pixel, and an image filter to use for processing of the objective pixel is specified in accordance with the average density values. Using the specified image filter, filter computation is performed on a main signal which represents the density of the objective pixel, whereby an output signal is generated. The main signal which represents the objective pixel is smoothed out in an area which is larger than the size of halftone dots. In accordance with the average density values, a reference value is acquired. A set of weighting factors is selected based on the reference value, thereby determining an effective size of the image filter. The determined effective size is large in a density range where moires are noticeable. A predetermined filter computation portion executes computation based on the respective weighting factors of the image filter which has the determined effective size, to thereby generate a filtered signal. Such processing makes excellent suppression of a degraded image quality and removal of the moires possible, without deteriorating an edge of the image.

12 Claims, 11 Drawing Sheets

ID=1

| 1 | 2 | 4 | 2 | 1 |
|---|---|---|---|---|
| 2 | 4 | 8 | 4 | 2 |
| 4 | 8 | 16 | 8 | 4 |
| 2 | 4 | 8 | 4 | 2 |
| 1 | 2 | 4 | 2 | 1 |

ID=2

| 0 | 1 | 1 | 1 | 0 |
|---|---|---|---|---|
| 1 | 2 | 3 | 2 | 1 |
| 1 | 3 | 4 | 3 | 1 |
| 1 | 2 | 3 | 2 | 1 |
| 0 | 1 | 1 | 1 | 0 |

ID=3

| 0 | 0 | 0 | 0 | 0 |
|---|---|---|---|---|
| 0 | 1 | 2 | 1 | 0 |
| 0 | 2 | 4 | 2 | 0 |
| 0 | 1 | 2 | 1 | 0 |
| 0 | 0 | 0 | 0 | 0 |

FIG. 11

IDy=3

F13
```
0 0 0 0 0
0 1 2 1 0
4 4 4 4 4
0 1 2 1 0
0 0 0 0 0
```

F23
```
0 0 0 0 0
0 0 1 0 0
1 3 4 3 1
0 0 1 0 0
0 0 0 0 0
```

F33
```
0 0 0 0 0
0 0 1 0 0
0 1 4 1 0
0 0 1 0 0
0 0 0 0 0
```

IDy=2

F12
```
0 1 1 1 0
2 3 3 3 2
4 4 4 4 4
2 3 3 3 2
0 1 1 1 0
```

F22
```
0 1 1 1 0
1 2 3 2 1
1 3 4 3 1
1 2 3 2 1
0 1 1 1 0
```

F32
```
0 0 1 0 0
0 0 3 0 0
0 1 4 1 0
0 0 3 0 0
0 0 1 0 0
```

IDy=1

F11
```
4 4 4 4 4
4 4 4 4 4
4 4 4 4 4
4 4 4 4 4
4 4 4 4 4
```

F21
```
0 2 4 2 0
1 3 4 3 1
1 3 4 3 1
1 3 4 3 1
0 2 4 2 0
```

F31
```
0 0 4 0 0
0 1 4 1 0
0 2 4 2 0
0 1 4 1 0
0 0 4 0 0
```

IDx=1    IDx=2    IDx=3

| 1 | 2 | 4 | 2 | 1 |
|---|---|---|---|---|
| 2 | 4 | 6 | 4 | 2 |
| 4 | 6 | 8 | 6 | 4 |
| 2 | 4 | 6 | 4 | 2 |
| 1 | 2 | 4 | 2 | 1 |

METHOD OF AND APPARATUS FOR PROCESSING AN IMAGE FILTER

BACKGROUND OF THE INVENTION

1. Field of the Invention

The present invention relates to a method of and an apparatus for processing a digital image which is obtained from a scanner, a digital camera or other apparatuses.

2. Description of the Background Art

A printed matter is customarily created by printing haldtone dots. A printed matter which is printed in halftone dots has a resolution of about 65 to 200 dpi.

FIG. 13 shows a case that an image inputting portion such as a scanner reads a printed matter which is recorded in halftone dots. FIG. 13 is a view of a positional relationship between halftone dots and pixels which are to be read, and the illustrated halftone dot image which is an original image has a density of 50%. In other words, the shadowed regions in FIG. 13 are a portion where haldtone dots are recorded. Now, a description will be given on a case where such an original image is read as pixels P1 to P8 whose size is indicated as the dotted frames.

The size of one pixel shown in FIG. 13 is about 87.5% of the size of one halftone dot. In such a case, densities which are measured in the pixels P4 and P5 are 50% and the same as the density of the original image, and therefore, a consistency is ensured. However, densities which are measured in the pixels P1 and P8 are higher than 50% since much blackened region where the halftone is blackened is contained in a pixel region of each one of the pixels P1 and P8. In reality, the densities in the pixels P1 and P8 are about 62%. Meanwhile, densities which are measured in the pixels P2, P3, P6 and P7 are also higher than 50%. Thus, the densities which are measured in the pixels P1, . . . , P8 periodically change between 50% and 62%. Considering that the density of the original image is 50%, this is a deterioration in the quality of the image.

A cause is interference which is created due to differences between the halftone dot size of the original image and the pixel size of the pixels which are to be read. Hence, as the pixel size becomes smaller than the halftone dot size, the densities of the halftone dots are read rather than the density of the original image are read, which leads to greater changes in the density between the pixels. Further, when the pixel size is close to the halftone dot or in a similar situation, a cycle of the density change becomes longer, which appears as moire patterns which are visually noticeable.

Moire patterns are noticeable where a density level is flat. In reality, although moires are not very noticeable in a middle density region where a density is 50%, moires appear remarkably noticeable in a high density region where a density is higher or a low density region where a density is lower and degrades the quality of an image.

The phenomenon described above occurs also when a similar condition to the above is satisfied regarding a relationship between a pixel size and a pattern of a general original image which is expressed by other method except for halftone dots, a pattern of an object, or the like. In short, in some cases, moires are created from an image which is obtained by reading a transparent original or a reflective original with a scanner and an image which is obtained with a digital camera.

To eliminate moires and prevent a deterioration in the quality of an image, image processing using an image filter is customarily performed.

FIG. 14 is a schematic structure diagram of a conventional image processing apparatus. A main signal S regarding a pixel which is to be processed (hereinafter "objective pixel") is subjected to filter computation which is performed by an image filter which has a predetermined size which is set in advance by a filter computation portion 400, whereby a filtered signal S' is generated. FIG. 15 shows one example of the image filter which is used for this purpose. In such a conventional image processing apparatus, both a horizontal size and a vertical size of the image filter are set to be about twice the size of each halftone dot. Hence, in the case of the image filter which is shown in FIG. 15, for example, the size of one pixel is about ⅔ of the size of halftone dots or larger. In the conventional image processing apparatus, the filter computation portion 400 aligns the center of the image filter to an objective pixel, calculates a weighted mean of the respective density values in accordance with weighting factors which are assigned to the objective pixel and surrounding pixels, and outputs the weighted mean as the filtered signal S'.

As described above, the conventional image processing apparatus executes the processing using the image filter as that shown in FIG. 15 to thereby calculate a weighted mean of the densities in a region which is larger (i.e., about twice larger) than the halftone dot size and perform smoothing, and therefore, the conventional image processing apparatus removes a frequency component which is contained in a halftone dot pattern and eliminate an influence due to the halftone dot size. Hence, a filtered image does not contain moires nor have a degraded image quality.

By the way, in general, an edge portion of an image of a printed matter which is recorded in halftone dots is reproduced with a higher resolution than a halftone dot size. FIGS. 16A, 16B and 16C are explanatory diagrams showing a conventional method of generating one halftone dot. As shown in FIG. 16A, a region which indicates the size of one halftone dot is divided into four blocks B1, . . . , B4, and each block is further divided into blackened regions. A threshold value is set for each blackened region, as shown in FIG. 16A. On the other hand, when a density value which is obtained by reading an original image is "20" at positions which correspond to the blocks B1 and B4 but "10" at positions which correspond to the blocks B2 and B3 as shown in FIG. 16B, the density value is compared with the threshold values which are shown in FIG. 16A and the regions are blackened one by one from the center of the halftone dot. In this manner, the halftone dot as that shown in FIG. 16C is recorded.

FIG. 17 shows a case where an edge portion of an image is recorded by such a recording method. FIG. 17 illustrates an edge portion of a halftone dot image, and the dotted line in FIG. 17 indicates an edge of the image. The right-hand side of the dotted line is where a density is 50%, while the left-hand side of the dotted line is where a density is 0%. As shown in FIG. 17, since halftone dots are recorded in accordance with density values which correspond to the respective four divided blocks in the edge portion of the halftone dot image, the image is reproduced with a high resolution. A middle density region of an original image contains relatively many such edge portions of the halftone dot image which are reproduced with a high resolution.

However, as the conventional image processing apparatus executes smoothing using the image filter as that shown in FIG. 15 in an effort to prevent moires and a degraded image quality, an edge portion of a halftone dot image which is reproduced with a high resolution in the manner described above is also smoothed out and smeared.

SUMMARY OF THE INVENTION

The present invention is directed to an image processing method of applying predetermined processing to an original image pixel by pixel. The image processing method comprises the steps of: a) calculating an average density value from a pixel group which contains an objective pixel and neighboring pixels around the objective pixel; b) specifying an image filter in accordance with the average density value; and c) applying filter computation to a density signal regarding the objective pixel, using the image filter, to thereby generate an output signal.

Preferably, in the method above, the step b) comprises the step of b-1) specifying an effective size of the image filter in accordance with the average density values, and the step c) comprises the step of c-1) applying filter computation to the density signal regarding the objective pixel, using the image filter which has the effective size.

Hence, it is possible to suppress moires or a degraded image quality which are created in an optional density range, while preventing a deterioration in an original image in a density range in which removal of moires or the like is not necessary.

Further, the original image is an image which is obtained by reading a halftone dot original, and the effective size is set larger than the size of each one of halftone dots which form the halftone dot original. This makes it possible to remove an influence of the size of each halftone dot over the image. A filtered image is free from moire, a degraded image quality, etc.

Further, the step b-1) comprises the step of b-1-1) setting the effective size relatively large when the average density value is in a high density region or a low density region and setting the effective size relatively small when the average density value is in a middle density value. This makes excellent elimination of moires which are noticeable in the high density region and the low density region possible, while preventing a deterioration in edge portions which appear in a large number in a middle density range of an image which is reproduced with a high resolution.

Further, in the present invention, the step a) comprises the step of a-1) performing smoothing processing on each one of plurality of neighboring pixels which are located in the vicinity of the objective pixel, in a predetermined region around each one of the plurality of the neighboring pixels, to thereby calculate a plurality of average density values regarding the plurality of the neighboring pixels, and the step b) comprises the steps of: b-1) calculating a contrast regarding the objective pixel based on the plurality of average density values which are obtained from the plurality of the neighboring pixels; and b-2) determining weighting factors which are to be assigned to respective components of the image filter in accordance with the contrast.

Thus, even processing based on contrasts does not deteriorate an edge of the image, but rather, it is possible to suppress a deterioration in an image quality in an excellent manner and remove moires. In this case as well, if the size of the image filter is set larger than the size of the halftone dots, it is possible to eliminate a degraded image quality and moires due to an influence of the halftone dots.

Further, if contrasts in a plurality of different directions are calculated based on a plurality of the average density values which are obtained from a plurality of the neighboring pixels and a distribution of effective weighting factors is changed for each one of the different directions in accordance with the contrasts, it is possible to obtain an image filter which corresponds to the direction of an edge of the original image. Hence, it is possible to use an image filter which preserves an edge of the original image and suppresses moires and a degraded image quality in an excellent manner during the image processing.

According to the present invention, the method above is also applicable to an apparatus.

Accordingly, an object of the present invention is to provide an image processing method and an image processing apparatus which suppress a deterioration in the quality of an image in an excellent manner and remove moires without degrading an edge of the image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a view showing an example of image filters which are obtained in a weighting factor set selecting portion in the third preferred embodiment;

DESCRIPTION OF THE PREFERRED EMBODIMENTS

<1. Overall Structure Of Apparatus>

Figure 1:
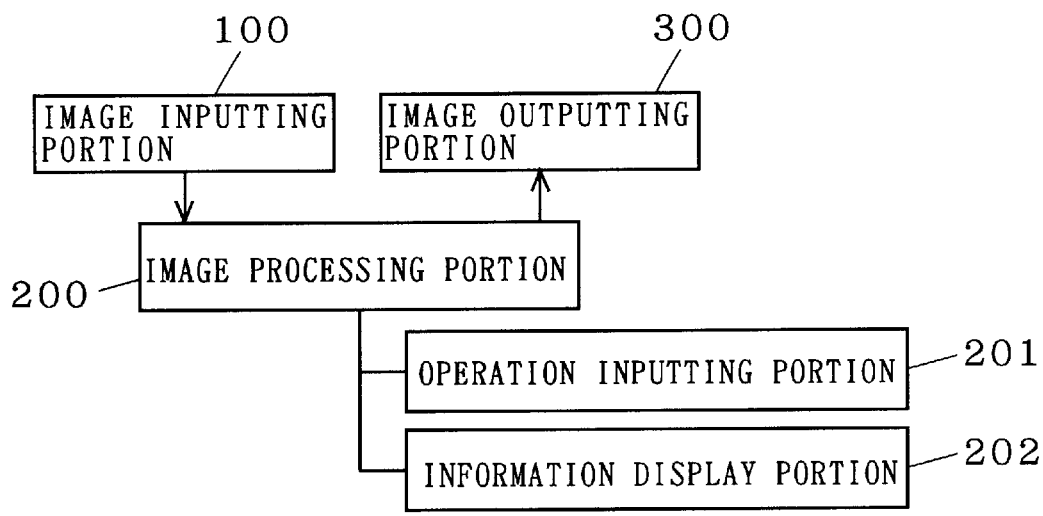
FIG. 1 is a schematic diagram showing an overall structure of an apparatus to which the present invention is applied.

First, one example of an overall structure of an apparatus to which preferred embodiments of the present invention are applied will be described. FIG. 1 is a schematic diagram showing an overall structure of an apparatus to which the present invention is applied. An image inputting portion 100, like an input scanner, optically reads an original and creates original image data which indicate a multi-level density value of each pixel. The original image data which are created are transferred to an image processing portion 200. The image processing portion 200 is a processing portion to which image processing apparatuses according to the preferred embodiments of the present invention are applied. After processed through image processing which uses an image filter apparatus according to the preferred embodiments of the present invention and through other predetermined processing in the image processing portion 200, the original image data are outputted to an image outputting portion 300 such as an output scanner. In the image outputting portion 300, the original image data are recorded to a recording medium such as a film. An operation inputting portion 201, such as a keyboard and a mouse, and an information displaying portion 202, such as a display, are disposed so that the image inputting portion 100, the image processing portion 200 and the image outputting portion 300 perform desired operations which are wanted by an operator.

<2. Outline Of Image Processing>

Next, a manner in which the image processing apparatuses according to the preferred embodiments of the present invention perform processing. The image processing apparatuses according to the preferred embodiments of the present invention perform image processing using an image filter. That is, by scanning an image filter which is in the form of a matrix of M×N (M and N are odd numbers which are equal or larger than 3) within a plane of an image, the image is smoothed out or otherwise processed.

Figure 2A:
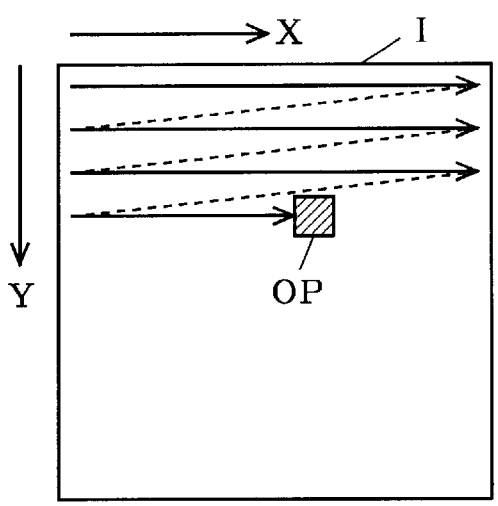
FIGS. 2A and 2B are explanatory diagrams showing an outline of image processing according to preferred embodiments of the present invention.
Figure 2B:
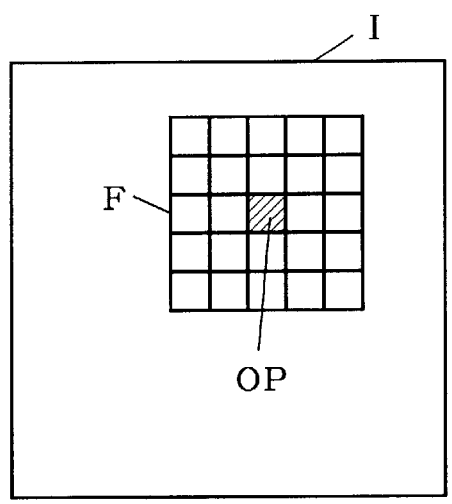

FIGS. 2A and 2B are explanatory diagrams showing an outline of the image processing according to the preferred embodiments of the present invention. An image I which is shown in FIG. 2A is sequentially processed, as an objective pixel OP is scanned over pixel by pixel, where an X-direction (horizontal direction) is a main scanning direction and a Y-direction (vertical direction) is a sub scanning direction. During the processing using an image filter, the objective pixel OP is positioned at the center of the image filter F as shown in FIG. 2B. In the example shown in FIG. 2B, an image filter which is in the form of a matrix of 5×5 (M=N=5) is used. In accordance with weighting factors which are assigned to respective components of the image filter, a weighted mean of a density value of the objective pixel OP and density values of pixels around the objective pixel OP is calculated. The calculated value is used as a filtered signal which represents the objective pixel OP.

Figure 3:
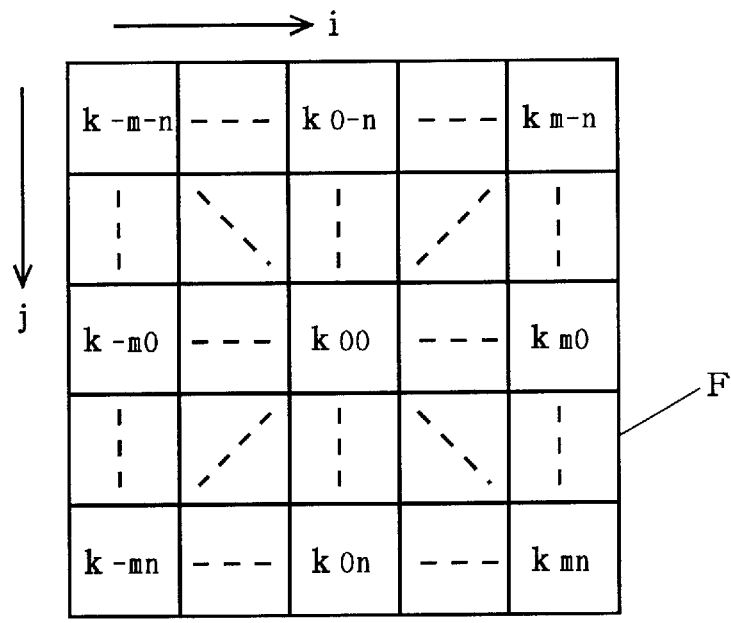
FIG. 3 is a view showing weighting factors of respective components of an image filter.

In other words, it is assumed that the image filter F is a matrix whose size is (2m+1)×(2n+1) as shown in FIG. 3 and that weighting factors $k_{-m-n}$ to $k_{mn}$ are assigned to the respective components of the image filter F. The filtered signal $S'_{xy}$ which is obtained by filter-computing the objective pixel OP which is positioned at a coordinate (x, y) on the image plane, is expressed as:

$$S'_{xy} = \frac{\sum_{i=-m}^{m} \sum_{j=-n}^{n} k_{ij} \cdot S_{x+i,y+j}}{\sum_{i=-m}^{m} \sum_{j=-n}^{n} k_{ij}} \qquad \text{Eq. 1}$$

where $S_{x,y}$ is a density value of a pixel which is positioned at a coordinate (x, y) on the image plane of the original image.

When the weighting factors which correspond to the objective pixel and the neighboring pixels in the image filter which is shown in FIG. 3 are all positive numbers, the image filter serves as an image filter for smoothing out an image. Thus, a frequency characteristic of the weighting factors is a characteristic of the image filter.

<3. First Preferred Embodiment>

Figure 4:
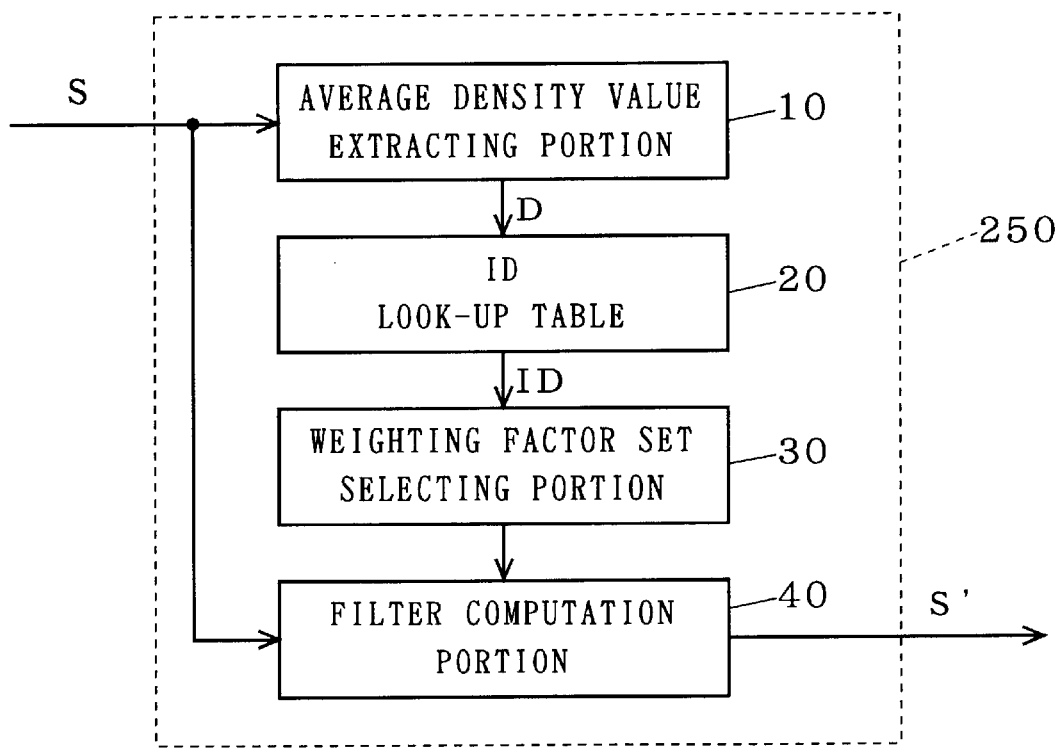
FIG. 4 is a schematic structure diagram of an image processing apparatus according to a first preferred embodiment of the present invention.

Now, an image processing apparatus according to a first preferred embodiment of the present invention will be described. FIG. 4 is a schematic structure diagram of the image processing apparatus 250 according to the first preferred embodiment of the present invention. A main signal regarding an objective pixel is supplied to an average density value extracting portion 10 and a filter computation portion 40.

The average density value extracting portion 10 calculates an average density value D for a pixel group which contains the objective pixel and neighboring pixels. An area of the objective pixel and the neighboring pixels for calculating the average density value D is set larger than the size of halftone dots of an original image, so that the configurations of the halftone dots are not detected. This is because between a case where the size to be smoothed out is not sufficiently large and is close to the center of halftone dots and an opposite case, the average density value D may have a different density value from a density value which the original image is supposed to originally have. In this manner, the average density value D is a density value the original image originally has which is not affected by the halftone dots. A method of calculating the average density value D may be simple averaging for a pixel group which contains the objective pixel and neighboring pixels, or may be weighted averaging. The average density value D which is calculated by the average density value extracting portion 10 is supplied to an ID look-up table 20.

Figures 5, 6A, 6B, 6C:
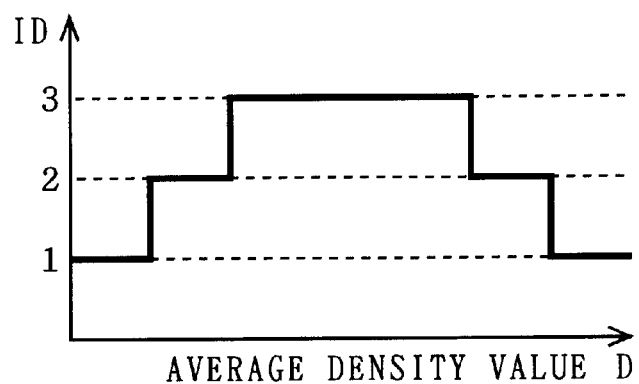
FIG. 5 is a view showing a relationship between an average density value D and a reference value ID.
FIGS. 6A, 6B and 6C are views showing examples of image filters which are used in the image processing apparatus according to the preferred embodiments of the present invention.

The ID look-up table 20 outputs a reference value ID in accordance with the average density value D which is supplied thereto. FIG. 5 shows a relationship between the average density value D and the reference value ID. As shown in FIG. 5, the reference value ID can have values "1," "2" and "3." The reference value ID becomes small as the average density value D increases to a high density range or decreases in a low density range, whereas the reference value ID has a maximum value "3" when the average density value D remains in a middle density range. The ID look-up table 20 stores a table which represents the relationship shown in FIG. 5 in a storage element such as a memory. Receiving the average density value D, the ID look-up table 20 refers to the table and acquires the corresponding reference value ID. The reference value ID which is obtained in this manner is supplied to a weighting factor set selecting portion 30.

The weighting factor set selecting portion 30 determines all weighting factors $k_{-m-n}$ to $k_{mn}$ which are to be used in the image filter, in accordance with the received reference value ID. The weighting factor set selecting portion 30 as well comprises a storage element, such as a memory, which stores image filters as those shown in FIGS. 6A, 6B and 6C in each of which weighting factors which correspond to each value of the reference value ID are set.

As shown in FIG. 6A, when the reference value ID having the value "1" is inputted, effective weighting factors are assigned to all the components of the 5×5 image filter. When the inputted reference value ID has the value "2" as shown in FIG. 6B, an ineffective weighting factor "0" is assigned to the components at the four corners of the 5×5 image filter. Further, when the inputted reference value ID has the value "3" as shown in FIG. 6C, the ineffective weighting factor "0" is assigned to the components at an outer periphery of the 5×5 image filter. When a weighting factor Kij (i and j are optional integers) is "0," a density value of a pixel which corresponds to a coordinate position (i, j) does not exert any influence at all over the processing which is realized with the image filter. Meanwhile, the weighting factors other than "0" assigned to the components of the image filter are effective weighting factors. Hence, as shown in FIGS. 6A, 6B and 6C, the image filters which have different effective sizes are specified in accordance with the reference value ID. That is, the image filter which has the largest effective size is specified when the reference value ID has the value "1," the image filter which has a medium effective size is specified when the reference value ID has the value "2," and the image filter which has the smallest effective size which is substantially 3×3 is specified when the reference value ID has the value "3."

In addition, since the reference value ID is small in the high density range or the low density range but has the largest value of "3" in the middle density range as shown in FIG. 5, the image filter which is specified by the weighting factor set selecting portion 30 is the image filter which has a large effective size when the objective pixel belongs to the high density range or the low density range of the original image, but is the image filter which has a small effective size when the objective pixel belongs to the middle density range of the original image.

Although the image filters which are shown in FIGS. 6A, 6B and 6C all have a filter size of 5×5 as one example, the filter size is not limited to this. However, for excellent elimination of a degraded image quality or moires due to an influence of halftone dots, the size of the image filter which has the largest effective size (See FIG. 6A) is preferably about double the size of or larger than the size of the halftone dots of the original image.

Using the weighting factors of the image filter which is obtained by the weighting factor set selecting portion 30, the filter computation portion 40 executes the computation which is shown as Eq. 1, to thereby create the filtered signal S'. The filtered signal S' serves as an output signal from the image processing apparatus 250.

Although data which are outputted to the filter computation portion 40 from the weighting factor set selecting portion 30 may be the weighting factors which are assigned to the respective components, the data are not limited to such.

Further, if the weighting factors are stored in advance in the storage element such as a RAM of the filter computation portion 40, the weighting factor set selecting portion 30 may be eliminated. That is, as the reference value ID, the ID look-up table 20 may output an offset value of an address at which the RAM of the filter computation portion 40 is accessed in accordance with the average density value D.

The filter computation portion 40 may then access the RAM based on the offset value which is indicated by the reference value ID, whereby the respective weighting factors which correspond to the average density value D are directly acquired.

Thus, the image processing apparatus according to the first preferred embodiment performs image processing using the image filter which has a small effective size for the middle density range in which moires are not noticeable, but performs image processing using the image filter which has a large effective size for the high density range and the low density range in which moires and a deterioration in an image quality are remarkably noticeable, and therefore, it is possible to prevent a deterioration in image qualities in the high density range and the low density range without degrading edge portions of images which exist in a relatively large number in the middle density range of the original image.

In addition, with respect to the effective size of the image filter which is applied for the high density range or the low density range, since a weighted mean of densities in an area which is larger than the size of the halftone dots of the original image is calculated for the purpose of smoothing, it is possible to remove a frequency component of a halftone dot pattern, and therefore, it is possible to remove an influence of the size of the halftone dots. This prevents moires or a deterioration in an image quality in a filtered image.

The foregoing has described that the ID look-up table 20 of the image processing apparatus 250 according to the first preferred embodiment outputs the reference value ID based on the relationship between the average density value D and the reference value ID as that shown in FIG. 5. However, according to the relationship shown in FIG. 5, as the average density value D successively changes from the low density range to the high density range, the reference value ID which is outputted change stepwise. In short, in the relationship shown in FIG. 5, the reference value ID can not have an intermediate value (i.e., a value with a fractional part) such as "1.5" and "2.3".

However, for the purpose of enhancing the accuracy of the image processing using the image filters, the reference value ID which is outputted may be set so as to successively change while taking an intermediate value as the average density value D successively changes from the low density range to the high density range. In this case, when the reference value ID is an intermediate value such as "1.5", the weighting factor set selecting portion 30 calculates intermediate values for the respective components from the weighting factors for the reference value ID of "1" which are shown in FIG. 6A and the weighting factors for the reference value ID of "2" which are shown in FIG. 6B and uses the calculated values as the respective weighting factors.

Further, while the foregoing has described the first preferred embodiment in relation to where the reference value ID is small when the average density value D is in the high density range or the low density range and the reference value ID is large when the average density value D is in the middle density range, as an example, the reference value ID and the average density value D are not limited to such a relationship. Rather, it is only necessary that the effective size of the image filter is eventually large when the average density value D indicates the high density range or the low density range and the effective size of the image filter is eventually small when the average density value D indicates the middle density range.

Still further, it is possible to enlarge or reduce the effective size of the image filter for an optional density range, by using other relationship as the relationship between the average density value D and the reference value ID in the ID look-up table 20. Hence, applying the image processing apparatus according to the first preferred embodiment, it is possible to eliminate a deterioration in an image quality and moires in an optional density range.

In general terms, the image filter which is used in the image processing apparatus described above is an m×n image filter (m and n are integers which are equal to or larger than 2), and the objective pixel is placed at a central portion of the image filter.

<4. Second Preferred Embodiment>

Figure 7:
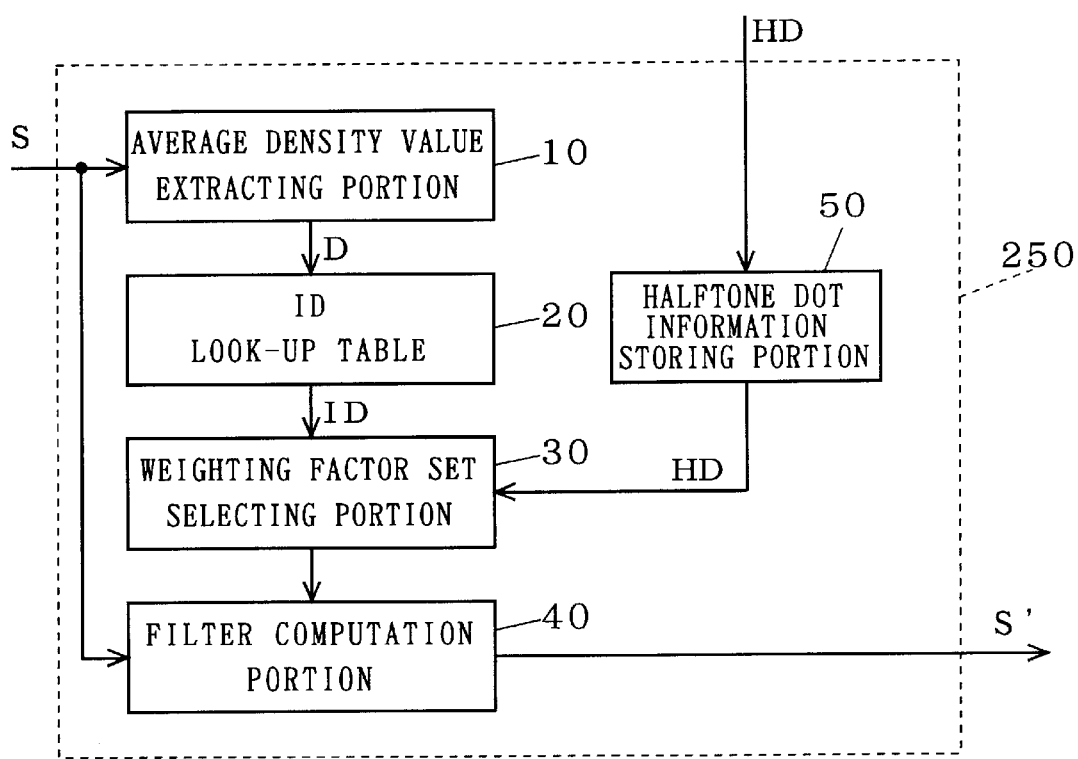
FIG. 7 is a schematic structure diagram of an image processing apparatus according to a second preferred embodiment of the present invention.

Now, an image processing apparatus according to a second preferred embodiment of the present invention will be described. FIG. 7 is a schematic structure diagram of an image processing apparatus 250 according to the second preferred embodiment of the present invention. The image processing apparatus 250 according to the second preferred embodiment has a structure which can change the size of the image filter to a proper size when the size of the halftone dots of the original image is changed. Hence, a difference from the image processing apparatus shown in FIG. 4 described as the first preferred embodiment is that the image processing apparatus according to the second preferred embodiment performs image processing based on halftone dot information HD.

A method of detecting the size of the halftone dots of the original image may be a method in which the size of the halftone dots is measured when the image inputting portion 100 reads the original image, or may be a method in which an operator sets and inputs the size of the halftone dots through the operation inputting portion 201 when the operator sets the original image to the image inputting portion 100, etc. The information which are obtained in this manner regarding the size of the halftone dots is called halftone dot information, and the halftone dot information are supplied to the image processing apparatus 250 according to the second preferred embodiment.

In the image processing apparatus 250 shown in FIG. 7, the halftone dot information HD to be inputted are supplied to and stored in a halftone dot information storing portion 50. The halftone dot information HD are thereafter transferred to the weighting factor set selecting portion 30. The halftone dot information storing portion 50 is not necessary when it is not necessary to store the halftone dot information HD, and instead, the halftone dot information HD are supplied directly to the weighting factor set selecting portion 30.

The weighting factor set selecting portion 30 sets, based on the halftone dot information HD, the size of the image filter which is to be used in the filter computation portion 40, and supplies a corresponding number of weighting factors which correspond to the size to the filter computation portion 40 as a set of weighting factors.

As the size of the halftone dots of the original image becomes large, it is necessary to enlarge the size of the image filter based on the halftone dot information HD. This is because it is necessary to enlarge the size of the image filter which has the largest effective size approximately twice, for the purpose of preventing moires and a degraded image quality. Conversely, when the size of the halftone dots of the original image becomes small, it is necessary to reduce the size of the image filter based on the halftone dot information HD. This is because if the image filter which has unnecessarily large size is applied, the original image is only smudged and a reproducibility of the original image accordingly degrades.

In the weighting factor set selecting portion 30, for example, while the effective size of the image filter whose size is 5×5 is changed before the size of the halftone dots is changed, when the size of the halftone dots is changed to a larger size, the image filter whose size is 7×7, 9×9 or the like is used and the effective size of the image filter which has that size is changed based on the reference value ID. Conversely, when the size of the halftone dots is changed to a smaller size, the image filter whose size is 3×3 or the like is used and the effective size of the image filter which has that size is changed based on the reference value ID.

Alternatively, the halftone dot information HD which are supplied to the image processing apparatus 250 may be transferred to the average density value extracting portion 10. In the average density value extracting portion 10, an area of the objective pixel and the neighboring pixels for calculating the average density value D is set larger than the size of halftone dots of the original image, so that the configurations of the halftone dots are not detected. However, when the area for extracting the average density value D is fixed and the size of halftone dots becomes accordingly large, the area may become smaller than the size of halftone dots in some cases. To prevent such, the halftone dot information HD are supplied to the average density value extracting portion 10 and the area for extracting the average density value D is changed based on the size of halftone dots which is indicated by the halftone dot information HD, whereby it is always possible to extract the average density value D which is not affected by the halftone dots and is therefore appropriate.

A flow of other processing is similar to that described in relation to the first preferred embodiment, and therefore, detailed processing at each portion will not be described. Describing an outline of the processing instead, the main signal S regarding the objective pixel is supplied to the average density value extracting portion 10 and the filter computation portion 40. The average density value extracting portion 10 extracts the average density value D for an area which corresponds to the size of halftone dots, and the average density value D is supplied to the ID look-up table 20. The ID look-up table 20 outputs the reference value ID which corresponds to the average density value D, as shown in FIG. 5. Hence, the reference value ID has a small value when the average density value D is in the high density range or the low density range and the reference value ID has a large value when the average density value D is in the middle density range. The weighting factor set selecting portion 30 sets the size of the image filter in accordance with the halftone dot information HD as described above, selects a set of weighting factors for the image filter which has that size based on the reference value ID, and determines the effective size of the image filter. At this stage, a set of weighting factors for reducing the effective size of the image filter is selected when the reference value ID is large, whereas a set of weighting factors for enlarging the effective size of the image filter is selected when the reference value ID is small. The filter computation portion 40 executes the computation which is shown as Eq. 1 based on the size of the image filter and the respective weighting factors which are obtained at the weighting factor set selecting portion 30, and creates the filtered signal S'.

Thus, the image processing apparatus according to the second preferred embodiment as well performs image processing using the image filter which has a small effective size for the middle density range in which moires are not noticeable, but performs image processing using the image filter which has a large effective size for the high density range and the low density range in which moires and a deterioration in an image quality are remarkably noticeable, and therefore, it is possible to prevent a deterioration in image qualities in the high density range and the low density range without degrading edge portions of images which exist in a relatively large number in the middle density range of the original image.

In addition, with respect to the effective size of the image filter which is applied for the high density range or the low density range, since a weighted mean of densities in an area which is larger than the size of the halftone dots of the original image is calculated for the purpose of smoothing, it is possible to remove a frequency component of a halftone dot pattern, and therefore, it is possible to remove an influence of the size of the halftone dots. This prevents moires or a deterioration in an image quality in a filtered image.

Further, even when the size of the halftone dots of the original image is changed, in the image processing apparatus according to the second preferred embodiment, the halftone dot information which represent the changed size of the halftone dots are inputted and the size of the image filter is automatically changed based on the halftone dot information. Hence, it is always possible to remove an influence of the halftone dots, which makes excellent elimination of moires and a degraded image quality possible.

<5. Third Preferred Embodiment>

Figure 8:
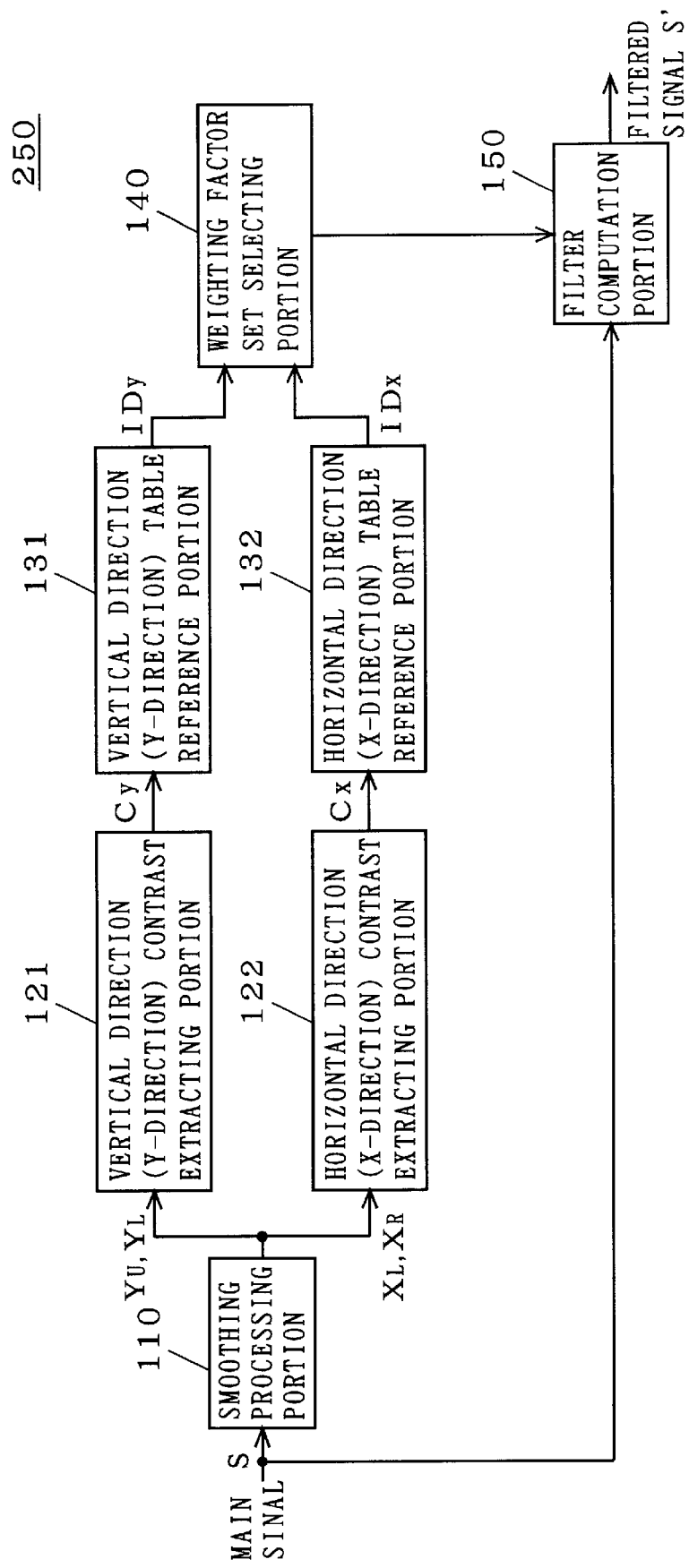
FIG. 8 is a schematic structure diagram of an image processing apparatus according to a third preferred embodiment of the present invention.

Now, an image processing apparatus according to a third preferred embodiment of the present invention will be described. FIG. 8 is a schematic structure diagram of an image processing apparatus 250 according to the third preferred embodiment of the present invention. The main signal S which indicates a density value of the objective pixel is supplied to a smoothing processing portion 110 and a filter computation portion 150.

Figure 9A:
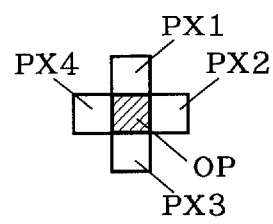
FIGS. 9A and 9B are explanatory diagrams for describing an upper neighboring pixel, etc.
Figure 9B:
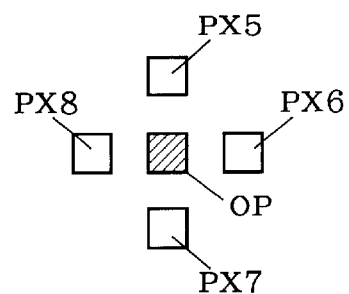

Receiving the main signal S regarding the objective pixel, the smoothing processing portion 110 executes smoothing of neighboring pixels around the objective pixel to thereby calculate an average density value. The neighboring pixels around the objective pixel from which the average density value is calculated may be four neighboring pixels around the objective pixel, i.e., a neighboring upper pixel, a neighboring lower pixel, a neighboring left-hand side pixel and a neighboring right-hand side pixel, for instance. As such neighboring pixels around the objective pixel, pixels PX1, PX2, PX3 and PX4 which are located above, to the right-hand side of, below, and to the left-hand side of the objective pixel may be used as the neighboring upper pixel, the neighboring right-hand side pixel, the neighboring lower pixel and the neighboring left-hand side pixel as shown in FIG. 9A, or alternatively, the neighboring upper pixel, the neighboring right-hand side pixel, the neighboring lower pixel and the neighboring left-hand side pixel may be pixels PX5, PX6, PX7 and PX8 which are located a few pixels away respectively from the pixel above, the pixel to the right-hand side of, the pixel below, and the pixel to the left-hand side of the objective pixel as shown in FIG. 9B.

The neighboring upper pixel, the neighboring right-hand side pixel, the neighboring lower pixel and the neighboring left-hand side pixel are each smoothed out in an area (i.e., smoothing area) which is larger than the size of the halftone dots and which is around the objective pixel. The reason for setting the smoothing area larger than the size of the halftone dots is to prevent detection of the configurations of the halftone dots, and hence, a large difference between a density value of a pixel which is close to the center of a halftone dot and a pixel which is not close to the center of a halftone dot, and to thereby obtain a density value the original image originally has.

The smoothing processing which is performed at this stage is realized by simple or weighted averaging of density values of pixels which are located within the smoothing area. An average density value with respect to the neighboring upper pixel which is obtained in this manner is $Y_U$, an average density value with respect to the neighboring lower pixel which is obtained in this manner is $Y_L$, an average density value with respect to the neighboring left-hand side pixel which is obtained in this manner is $X_L$, and an average density value with respect to the neighboring right-hand side pixel which is obtained in this manner is $X_R$. The smoothing processing portion 110 provides a vertical direction contrast extracting portion 121 with the average density values $Y_U$ and $Y_L$ with respect to the neighboring upper pixel and the neighboring lower pixel, while providing a horizontal direction contrast extracting portion 122 with the average density values $X_L$ and $X_R$ with respect to the neighboring left-hand side pixel and the neighboring right-hand side pixel.

The vertical direction contrast extracting portion 121 extracts a contrast in the vertical direction (i.e., Y-direction) which is a sub scanning direction in the vicinity of the objective pixel of the image. That is, using the average density values $Y_U$ and $Y_L$ to be inputted with respect to the neighboring upper pixel and the neighboring lower pixel, a contrast in the vertical direction Cy is calculated by:

$$Cy = |Y_U - Y_L| \qquad \text{Eq. 2}$$

The calculated contrast in the vertical direction Cy is supplied to a vertical direction table reference portion 131.

In a similar manner, the horizontal direction contrast extracting portion 122 extracts a contrast in the horizontal direction (i.e., X-direction) which is a main scanning direction in the vicinity of the objective pixel of the image. That is, using the average density values $X_L$ and $X_R$ to be inputted with respect to the neighboring left-hand side pixel and the neighboring right-hand side pixel, a contrast in the horizontal direction Cx is calculated by:

$$Cx = |X_L - X_R| \qquad \text{Eq. 3}$$

The calculated contrast in the horizontal direction Cx is supplied to a horizontal direction table reference portion 132.

In general, a large contrast denotes an edge portion of an image while a small contrast denotes a flat portion of the image where a density change is small. Hence, by calculating the contrast in the vertical direction and the contrast in the horizontal direction as described above, it is possible to judge what kind of portion of the image the objective pixel represents. Further, since the smoothing processing portion 110 executes smoothing processing, an edge of a halftone dot itself will not be detected.

The vertical direction table reference portion 131 comprises a storage element such as a memory. Referring to a table which is stored in the memory medium in advance, the vertical direction table reference portion 131 outputs a reference value IDy which corresponds to the contrast in the vertical direction Cy.

In a similar manner, the horizontal direction contrast extracting portion 122 comprises a storage element such as a memory. Referring to a table which is stored in the memory medium in advance, the horizontal direction contrast extracting portion 122 outputs a reference value IDx which corresponds to the contrast in the horizontal direction Cx.

Figure 10A:
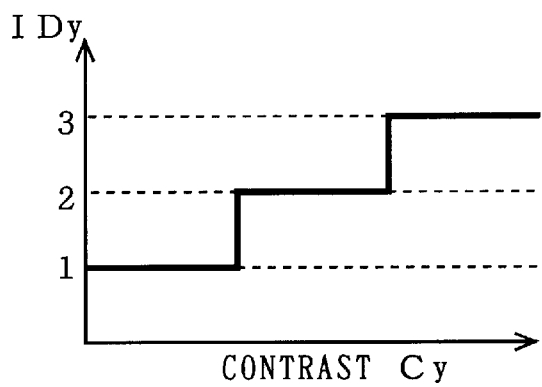
FIGS. 10A and 10B views showing relationships between inputs and outputs in a vertical direction table reference portion and a horizontal direction table reference portion in the third preferred embodiment.
Figure 10B:
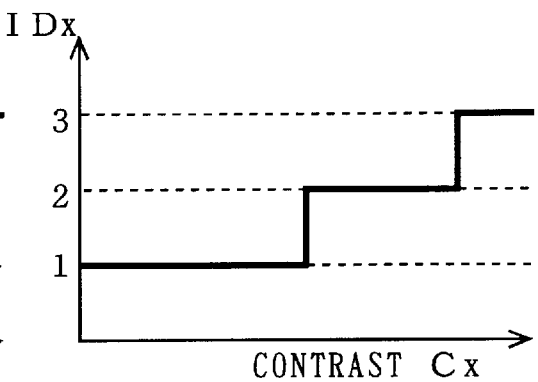

FIG. 10A is a view showing a relationship between the contrast in the vertical direction Cy which is inputted to the vertical direction table reference portion 131 and the reference value IDy which is outputted from the vertical direction table reference portion 131, while FIG. 10B is a view showing a relationship between the contrast in the horizontal direction Cx which is inputted to the horizontal direction contrast extracting portion 122 and the reference value IDx which is outputted from the horizontal direction contrast extracting portion 122. Such relationships between the inputs and the outputs are stored as tables in memories or the like. As shown in FIGS. 10A and 10B, the smaller the contrasts Cy and Cx are respectively in the vertical direction and the horizontal direction, the smaller the outputted values IDy and IDx are, and the larger the contrasts are, the larger the values IDy and IDx are. In other words, the values IDy and IDx are large when the objective pixel represents an edge portion of an image, whereas when the objective pixel represents a flat portion of the image, the values IDy and IDx are small. The values IDy and IDx which are obtained at the vertical direction table reference portion 131 and the horizontal direction contrast extracting portion 122 are thereafter supplied to a weighting factor set selecting portion 140.

Further, in the relationship between the reference value IDy for the vertical direction and the contrast in the vertical direction Cy as shown in FIG. 10A, while the value of the reference value IDy increases by 1 each time the contrast Cy increases approximately a constant amount, with respect to the reference value IDx for the horizontal direction shown in FIG. 10B, the value "1" extends into around an intermediate value of the contrast and the value "2" extends into a region where the contrast is high. That is, the reference value IDx for the horizontal direction is smaller than the reference value IDy for the vertical direction in some cases even though the contrast in the horizontal direction is the same as the contrast in the vertical direction. This is to consider that noises have different natures between the main scanning direction (horizontal direction) and the sub scanning direction (vertical direction) as an input scanner of the image inputting portion 100 optically reads an original. For example, a description will be given on an apparatus in which an input scanner reads an original in the main scanning direction using a CCD line sensor which covers a straight-line arrangement of a plurality of pixels and the input scanner reads in the sub scanning direction as the CCD line sensor or the original is moved at a constant speed by a driving mechanism such as a motor. In such an apparatus, while a noise appears every other pixel in the sub scanning direction, it is possible to electrically vary noises in the main scanning direction. When noises are electrically varied, a noise which is contained in one pixel is expanded or reduced in the main scanning direction. It is preferable to perform smoothing processing using a smoothing filter which has a large size in the main scanning direction when a noise is expanded in the main scanning direction, and therefore, a small reference value IDx may be outputted for the main scanning direction as shown in FIG. 10B.

However, when noises are not expanded or reduced in the main scanning direction, as in the case of the reference value IDy for the vertical direction shown in FIG. 10A, the reference value IDx for the horizontal direction as well may be set such that the value of the reference value IDx increases by 1 each time the contrast Cx increases approximately a constant amount.

Next, the weighting factor set selecting portion 140 selects and determines the weighting factors $K_{-m-n}$ to $K_{mn}$ which correspond to the reference values IDy and IDx which are supplied from the respective table reference portions. A storage portion such as a memory is disposed within the weighting factor set selecting portion 140, and the storage portion stores the weighting factors which correspond to the inputted reference values IDy and IDx. The weighting factors which are selected and determined with reference to the storage portion are supplied to the filter computation portion 150.

FIG. 11 is a view showing an example of image filters which are obtained in the weighting factor set selecting portion 140. As the value of the reference value IDy for the vertical direction becomes larger, weighting factors become smaller with a distance from the center of each image filter in the vertical direction. That is, since the contrast is high in the vertical direction, a pixel is judged as an edge portion of an image, and therefore, an area to be smoothed or the degree of smoothing becomes small. In a similar manner, as the value of the reference value IDx becomes larger, weighting factors become smaller with a distance from the center of each image filter in the horizontal direction. That is, with respect to an edge portion of an image with high contrast in the horizontal direction, an area to be smoothed or the degree of smoothing in the horizontal direction becomes small. As clearly understood by Eq. 1, a component of the image filters with an assigned weighting factor of "0" is not a weighting factor which is effective for the processing using the image filters.

For example, when the reference value IDy which is obtained by the vertical direction table reference portion 131 is "3" and the reference value IDx which is obtained by the horizontal direction contrast extracting portion 122 is "1," an image filter F13 which is shown in FIG. 11 is selected. In the image filter F13, although an area to be smoothed is large in the horizontal direction, an area to be smoothed is small in the vertical direction. This is attributed to a large contrast in the vertical direction and a small contrast in the horizontal direction. When the contrast in the vertical direction and the contrast in the horizontal direction are both large (IDy=3, IDx=3), an image filter F33 which is shown in FIG. 11 is selected and an area to be smoothed is smallest. This minimizes a deterioration in an edge portion of an image. When the contrast in the vertical direction and the contrast in the horizontal direction are both small (IDy=1, IDx=1), an image filter F11 which is shown in FIG. 11 is selected and the entire area of 5×5 is smoothed out.

Although the image filters which are shown in FIG. 11 all have a filter size of 5×5 as one example, the filter size is not limited to this. However, for excellent elimination of a degraded image quality or moires due to an influence of halftone dots, it is necessary that the size of the image filters are larger than the size of each halftone dot of an original image, and more preferably, are about double the size of or larger than the halftone dot size of the original image.

The filter computation portion 150 executes the computation which is shown as Eq. 1 based on the respective weighting factors which are supplied from the weighting factor set selecting portion 140, and generates the filtered signal S'. The filtered signal S' serves as an output signal from the image processing apparatus according to the third preferred embodiment. When the filtered signal S' is obtained in this manner, the processing for the objective pixel completes, and similar processing is performed with the next pixel in the next scanning order as the objective pixel. This is repeated, whereby the entire image is processed.

Although data which are outputted to the filter computation portion 150 from the weighting factor set selecting portion 140 may be weighting factors which are assigned to the respective components, the data are not limited to such.

Further, if the weighting factors are stored in advance in the storage element such as a RAM of the filter computation portion 150, the weighting factor set selecting portion 140 may be eliminated. That is, as the reference values IDy and IDx, the vertical direction table reference portion 131 and the horizontal direction contrast extracting portion 122 may respective output offset values of addresses at which the RAM of the filter computation portion 150 is accessed in accordance with the contrasts Cy and Cx of the respective directions. The filter computation portion 150 may then access the RAM based on the offset values which are indicated by the reference values IDy and IDx, whereby the respective weighting factors which correspond to the contrasts of the vertical and the horizontal directions are directly acquired.

As described above, the image processing apparatus 250 according to the third preferred embodiment uses the image filters which do not cause a deterioration in an edge of an original image for an edge portion of the original image, and uses the image filters which have larger sizes for a flat portion of the original image. This makes excellent suppression of a degraded image quality and removal of moires possible, without deteriorating the edge of the image.

Further, since the respective weighting factors of the image filters to be used are selected and determined based on the contrasts of the vertical and the horizontal directions, it is possible to detect the direction of an edge of an original image, and hence, to obtain an image filter which preserves the edge. Thus, it is possible to use an image filter which preserves the edge while suppressing moires, a deterioration in an image quality, etc.

For excellent elimination of moires, a degraded image quality, etc., the size of an image filter to be used in the filter computation portion 150 shown in FIG. 8 needs be larger than the size of halftone dots of an original image, as described earlier. Hence, when the halftone dot size of the original image is changed, it is necessary to change the size of the image filter which is used in the filter computation portion 150. When such is necessary, the following is performed for appropriate processing.

That is, when it is possible to detect the size of the halftone dots while the image inputting portion 100 (See FIG. 1) reads the original image, the halftone dot size which is detected is supplied to the image processing apparatus 250. Following this, the size of the image filter is changed to a proper size when the weighting factor set selecting portion 140 selects weighting factors, in the image processing apparatus 250. Alternatively, when the halftone dot size is changed, an operator may inputs the changed halftone dot size through the operation inputting portion 201 and the changed halftone dot size which is inputted in this manner may be entered to the image processing apparatus. Such a structure allows that an image filter which has a proper size is always used in accordance with an optional halftone dot size. Hence, whatever the original image may be, this makes excellent suppression of a degraded image quality and removal of moires possible, without deteriorating the edge of the image.

In addition, with respect to extraction of contrasts in the third preferred embodiment, while the foregoing has described that contrasts are extracted in both the vertical direction and the horizontal direction, preferably, a contrast in an oblique direction may be further extracted. For example, contrasts of the objective pixel may be extracted in an oblique direction which is diagonal to the upper right and an oblique direction which is diagonal to the upper left, and when the contrast in each oblique direction, an image filter which preserves an edge in each oblique direction may be used.

Further, a contrast may be extracted in other direction except for the vertical direction, the horizontal direction and an oblique direction. More precisely, in general terms, it is only necessary that the directions are different directions within an image filter which has a two-dimensional expansion.

Figure 12A:
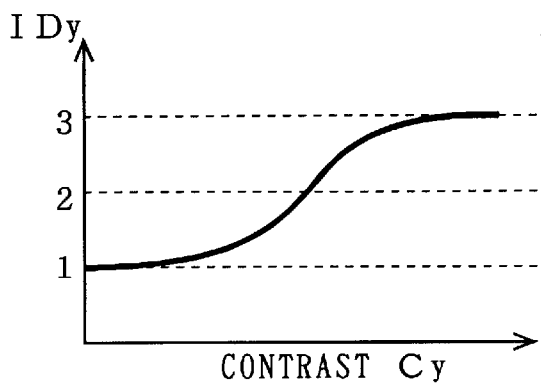
FIGS. 12A and 12B views showing relationships between inputs and outputs in the vertical direction table reference portion and the horizontal direction table reference portion in the third preferred embodiment.
Figure 12B:
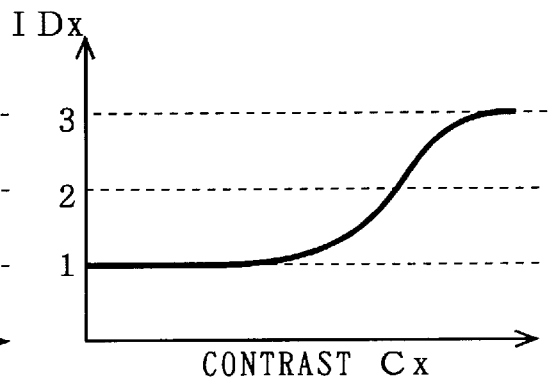
Figure 13:
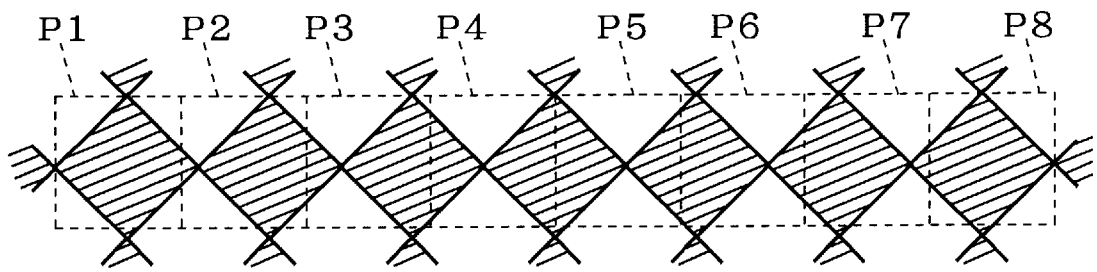
FIG. 13 is a view showing a positional relationship between halftone dots and pixels which are to be read.
Figures 14, 15:
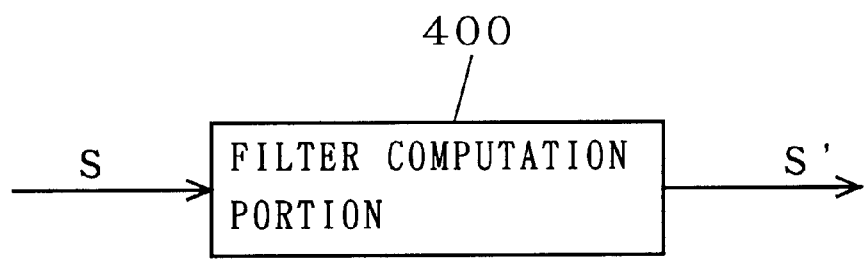
FIG. 14 is a schematic structure diagram of a conventional image processing apparatus.
FIG. 15 shows one example of an image filter.
Figure 16:
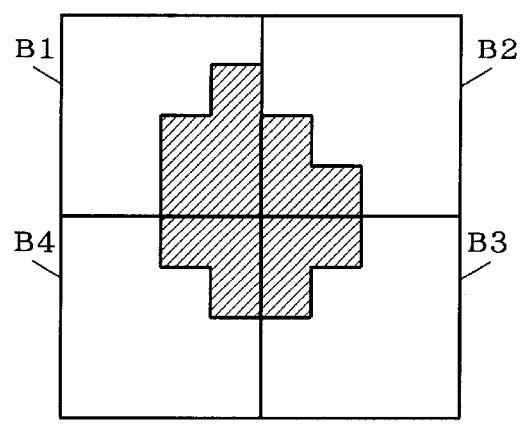
FIGS. 16A, 16B and 16C are views showing a conventional method of generating one halftone dot.
Figure 17:
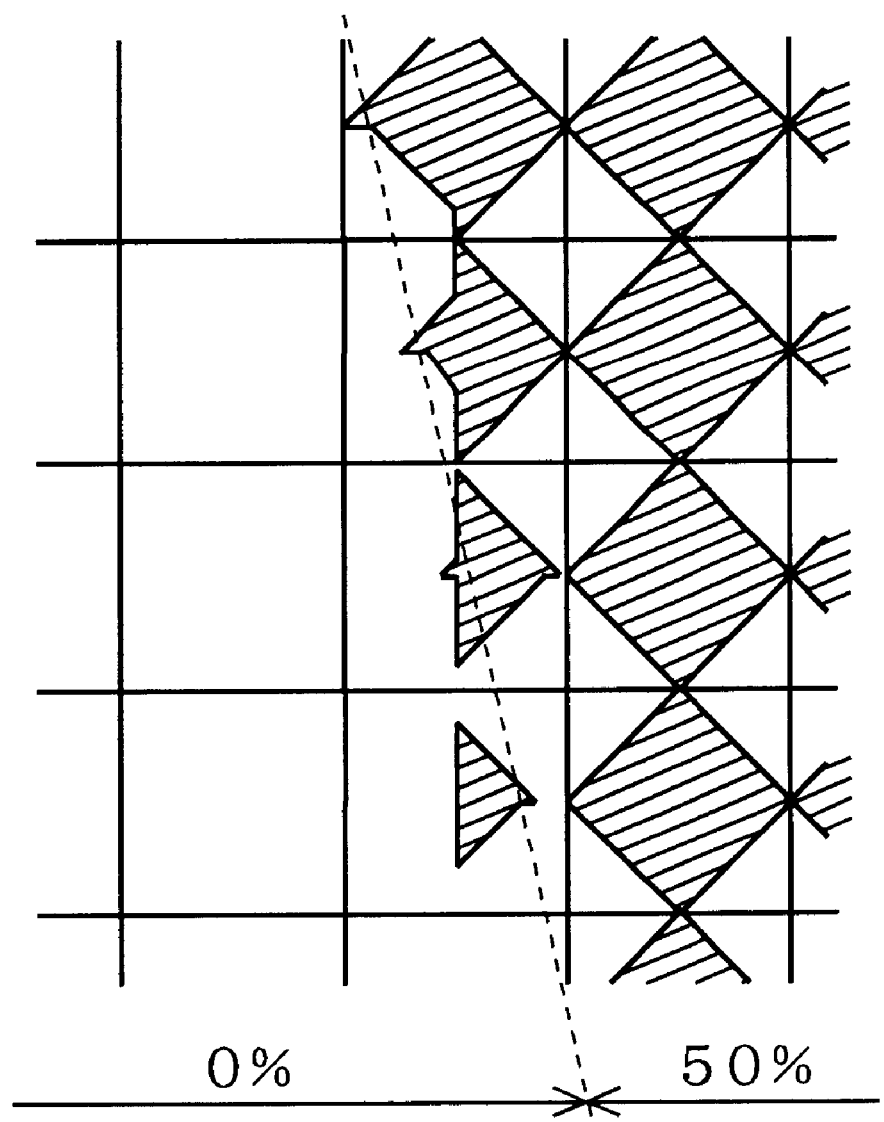
FIG. 17 is a view showing an edge portion of a halftone dot image.

Still further, although the foregoing has described that the reference values IDy and IDx which are obtained respectively by the vertical direction table reference portion 131 and the horizontal direction contrast extracting portion 122 each have the three values of "1," "2" and "3" as shown in FIGS. 10A and 10B, the reference values IDy and IDx may have more values more than three (i.e., intermediate values) as shown in FIGS. 12A and 12B, and a necessary image filter may be defined from computation based on the nine image filters as those shown in FIG. 11. This enhances the accuracy of the image processing.

The foregoing is not limited to a halftone dot original which represents an original image as halftone dots. When moires or the like exist in an image of other types, similar processing as well makes excellent suppression of a degraded image quality and removal of the moires possible, without deteriorating an edge of the image. The present invention is also applicable to image processing of an image which is obtained by a digital camera, for instance.

While the invention has been described in detail, the foregoing description is in all aspects illustrative and not restrictive. It is understood that numerous other modifications and variations can be devised without departing from the scope of the invention.

We claim:

1. An image processing method of applying predetermined processing to an original image pixel by pixel, comprising the steps of:
   a) calculating an average density value from a pixel group which contains an objective pixel and neighboring pixels around said objective pixel;
   b) specifying an image filter in accordance with said average density value;
   wherein said step b) comprises the step of
      b-1) specifying an effective size of said image filter in accordance with said average density value, and
   c) applying filter computation to a density signal regarding said objective pixel, using said image filter, to thereby generate an output signal;
   wherein said step c) comprises the step of
      c-1) applying filter computation to said density signal regarding said objective pixel, using said image filter which has said effective size.

2. The image processing method of claim 1, wherein said original image is an image which is obtained by reading a halftone dot original, and said effective size is set larger than the size of each one of halftone dots which form said halftone dot original.

3. The image processing method of claim 1, wherein said step b-1) comprises the step of
   b-1-1) setting said effective size relatively large when said average density value is in a high density region or a low density region and setting said effective size relatively small when said average density value is in a middle density region.

4. An image processing method of applying predetermined processing to an original image pixel by pixel, comprising the step of:
   a) calculating an average density value from a pixel group which contains an objective pixel and neighboring pixels around said objective pixel;

wherein said step a) comprises the step of
- a-1) performing smoothing processing on each one of plurality of neighboring pixels which are located in the vicinity of said objective pixel, in a predetermined region around each one of said plurality of said neighboring pixels, to thereby calculate a plurality of average density values regarding said plurality of said neighboring pixels, and
- b) specifying an image filter in accordance with said average density value;

wherein said step b) comprises the steps of:
- b-1) calculating a contrast regarding said objective pixel based on aid plurality of average density values which are obtained from said plurality of said neighboring pixels; and
- b-2) determining weighting factors which are to be assigned respective components of said image filter in accordance with said contrast; and
- c) applying filter computation to a density signal regarding said objective pixel, using said image filter, to thereby generate an output signal.

5. The image processing method of claim 4, wherein
said original image is an image which is obtained by reading a halftone dot original,
said step a-1) comprises the step of
- a-1-1) performing smoothing processing in a region which is larger than the size of each one of halftone dots which are around said objective pixel and form said halftone dot original, and said step b-2) comprises the step of
- b-2-1) setting the size of said image filter larger than the size of each one of halftone dots which form said halftone dot original.

6. The image processing method of claim 4, wherein
said step b-1) comprises the step of
- b-1-1) calculating contrasts in a plurality of different directions based on said plurality of average density values which are obtained from said plurality of said neighboring pixels, and said step b-2) comprises the step of
- b-2-1) in accordance with said contrasts in said plurality of different directions, changing a distribution of effective ones of said weighting factors for each one of said different directions.

7. An image processing apparatus for applying predetermined processing to an original image pixel by pixel, comprising:
- a) means for calculating an average density value from a pixel group which contains an objective pixel and neighboring pixels around said objective pixel;
- b) means for specifying an image filter in accordance with said average density value;

wherein said means b) comprises
- b-1) means for specifying an effective size of said image filter in accordance with said average density values, and
- c) means for applying filter computation to a density signal regarding said objective pixel, using said image filter, to thereby generate an output signal wherein said means c) comprises
- c-1) means for applying filter computation to said density signal regarding said objective pixel, using said image filter which has said effective size.

8. The image processing apparatus for claim 7, wherein said original image is an image which is obtained by reading a halftone dot original, and said effective size is set larger than the size of each one of halftone dots which form said halftone dot original.

9. The image processing apparatus for claim 7, wherein said means b-1) comprises
- b-1-1) means for setting said effective size relatively large when said average density value is in a high density region or a low density region and setting said effective size relatively small when said average density value is in a middle density region.

10. An image processing apparatus for applying predetermined processing to an original image pixel by pixel, comprising:
- a) means for calculating an average density value from a pixel group which contains an objective pixel and neighboring pixels around said objective pixel;

wherein said means a) comprises
- a-1) means for performing smoothing processing on each one of plurality of neighboring pixels which are located in the vicinity of said objective pixel, in a predetermined region around each one of said plurality of said neighboring pixels, to thereby calculate an a plurality of average density values regarding said plurality of said neighboring pixels;
- b) means for specifying an image filter in accordance with said average density value;

wherein said means b) comprises:
- b-1) means for calculating a contrast regarding said objective pixel based on said plurality of average density values which are obtained from said plurality of said neighboring pixels; and
- b-2) means for determining weighting factors which are to be assigned to respective components of said image filter in accordance with said contrast; and
- c) means for applying filter computation to a density signal regarding said objective pixel, using said image filter, to thereby generate an output signal.

11. The image processing apparatus for claim 10, wherein
said original image is an image which is obtained by reading a halftone dot original, and said means a-1) comprises
- a-1-1) means for performing smoothing processing in a region which is larger than the size of each one of halftone dots which are around said objective pixel and form said halftone dot original, and said means b-2) comprises
- b-2-1) means for setting the size of said image filter larger than the size of each one of halftone dots which form said halftone dot original.

12. The image processing apparatus for claim 10, wherein
said means b-1) comprises
- b-1-1) means for calculating contrasts in a plurality of different directions based on said plurality of average density values which are obtained from said plurality of said neighboring pixels, and said means b-2) comprises
- b-2-1) means for changing a distribution of effective ones of said weighting factors for each one of a different directions, in accordance with said contrasts in said plurality of different directions.

* * * * *